United States Patent [19]

Kinoshita

[11] Patent Number: 5,494,727
[45] Date of Patent: Feb. 27, 1996

[54] METALLIZED POLYESTER FILM CAPACITOR

[75] Inventor: Shinichi Kinoshita, Nagahama, Japan

[73] Assignee: Diafoil Hoechst Co., Ltd., Tokyo, Japan

[21] Appl. No.: 372,683

[22] Filed: Jan. 17, 1995

[30] Foreign Application Priority Data

Jan. 17, 1994 [JP] Japan .................................. 6-003112

[51] Int. Cl.⁶ .......................... B32B 15/08; B32B 27/36; B32B 27/40
[52] U.S. Cl. ........................ 428/141; 361/323; 428/336; 428/423.7; 428/425.8
[58] Field of Search ........................... 361/323; 428/141, 428/336, 425.8, 423.7, 423.1

[56] References Cited

U.S. PATENT DOCUMENTS

| | | | |
|---|---|---|---|
| 3,639,354 | 2/1972 | Mueller et al. | 260/77.5 |
| 3,758,443 | 9/1973 | Konig et al. | 260/75 NP |
| 4,131,731 | 12/1978 | Lai et al. | 528/370 |
| 5,379,180 | 1/1995 | Kinoshita | 361/323 |

FOREIGN PATENT DOCUMENTS

| | | | |
|---|---|---|---|
| 484956 | 5/1992 | European Pat. Off. . | |
| 0577142A1 | 7/1992 | European Pat. Off. | H01G 4/20 |
| 58-60430 | 4/1983 | Japan . | |
| 63-165418 | 7/1988 | Japan . | |
| 2004736 | 1/1990 | Japan | C07C 69/96 |
| 2032185 | 2/1990 | Japan | C09J 75/04 |
| 4245414 | 9/1992 | Japan | H01G 4/24 |

*Primary Examiner*—D. S. Nakarani
*Attorney, Agent, or Firm*—Foley & Lardner

[57] ABSTRACT

A metallized polyester film capacitor comprising as dielectric, a polyester film having a coating layer on at least one side of the polyester film, the coating layer comprising a polycarbonate polyurethane, and a metal deposited on the coated layer.

19 Claims, No Drawings

METALLIZED POLYESTER FILM CAPACITOR

BACKGROUND OF THE INVENTION

The present invention relates to a metallized polyester film capacitor. More particularly, it relates to a metallized polyester film capacitor with excellent moist heat resistance.

Polyester films such as polyethylene terephthalate films have been popularly used as base film of capacitors because they have excellent mechanical, thermal and electrical properties.

However, with development of various electronic machines in recent years, further improvement of properties of polyester films has been demanded. One of the required properties is long-term stability of moist heat resistance. A metallized polyester film is disadvantageous in stability of adhesion of the base film to deposited metal, especially in an environment of high temperature and high humidity. When the capacitor is exposed to a high temperature and a high humidity, moisture penetrates at the interface between the base film and the deposited metal, so that capacitance of the capacitor lowers with passage of time. Thus, improvement of moist heat resistance of capacitors has been demanded for long-term durability of the capacitor.

Japanese Patent Application Laid-Open (KOKAI) No. 4-245414 (1992) discloses a metallized polyester film capacitor using a polyester film having a polyester polyurethane coating layer, which is described as having excellent moist heat resistance.

However, even if the resin composition disclosed in the above Japanese KOKAI is used to the capacitor, satisfactory capacitor performance thereof can not be retained for a long term under a hot and humid environment.

Recent development of various electronic machines is remarkable and the capacitor are increasingly used under severer environments, so that the request for long-term stability of moist heat resistance, is further increasing.

As a result of studies by the present inventors, it has been found that by using as a base film, a polyester film having a coating layer composed of a polycarbonate polyurethane, the obtained capacitor comprising a metallized polyester film shows excellent moist heat resistance for a long term. The present invention has been attained on the basis of this finding.

SUMMARY OF THE INVENTION

In an aspect of the present invention, there is provided a metallized polyester film capacitor comprising as dielectric, a polyester film having a coating layer comprising a polycarbonate polyurethane on at least one side of the polyester film, and a metal deposited on the coating layer.

DETAILED DESCRIPTION OF THE INVENTION

The polyester in the polyester film according to the present invention is polyethylene terephthalate in which not less than 80 mol % of the structural units is ethylene terephthalate, polyethylene naphthalate in which not less than 80 mol % of the structural units is ethylenenaphthalate, or poly-1,4-cyclohexanedimethylene terephthalate in which not less than 80 mol % of the structural units is 1,4-cyclohexanedimethylene terephthalate. Other copolymer materials usable in the polyester film according to the present invention include diols such as diethylene glycol, propylene glycol, neopentyl glycol, polyethylene glycol and polytetramethyleneglycol; dicarboxylic acids such as isophthalic acid, 2,6-naphthalenedicarboxylic acid, 5-sodium sulfoisophthalic acid, adipic acid, azelaic acid, sebacic acid and ester-forming derivatives thereof; and oxymonocarboxylic acids such as oxybenzoic acid and ester-forming derivatives thereof.

The polyester film used in the present invention may contain additive particles, precipitated particles and other catalyst residues, which form protuberances on the film surface, in the amount which does not deteriorate the properties described later of the capacitor. Also, beside the protuberance-forming agent, there may be contained, if necessary, other additives such as antistatic agent, stabilizer, lubricant, crosslinking agent, anti-blocking agent, antioxidant, coloring agent, light shielding agent, ultraviolet absorber, etc., within the range in which the properties of the capacitor do not deteriorate.

The polyester film of the present invention may have a multi-layer structure as far as the finally obtained film properties satisfy the requirements of the present invention. In this case, a part of the layers may be composed of other material than polyester.

The coating layer on the polyester film contains a polycarbonate polyurethane. Polyurethane is synthesized from a polyol, a polyisocyanate and an optional chain-lengthening or crosslinking agent. In the polycarbonate polyurethane used in the present invention, at least part of the polyol which is a main component of polyurethane is polycarbonate polyol.

Examples of the polycarbonate polyols or the polyurethanes composed of polycarbonate units include compounds disclosed in Japanese Patent Publication (KOKOKU) Nos. 46-4191 (1971) and 49-2358 (1974) and Japanese Patent Application Laid-Open (KOKAI) Nos. 55-56124 (1980), 58- 60430 (1983) and 63-165418 (1988).

The polycarbonate polyol preferably has a number-average molecular weight of 200 to 20,000, and a hydroxyl number of 5 to 200.

The number-average molecular weight of the polycarbonate polyurethane is preferably 2,000 to 200,000, more preferably 1,000 to 100,000.

Polycarbonate polyol can be obtained, for example, by reacting a carbonate with a diol. Examples of the carbonate include ethylene carbonate, dimethyl carbonate, diethyl carbonate, diphenyl carbonate and dicyclohexyl carbonate. Examples of the diol include 1,6-hexanediol, 1,4-cyclohexanediol, 1,4-cyclohexanedimethanol, 3-methyl- 1,5-pentadiol, polyethylene glycol, polyoxyethylene glycol, polyoxypropylene glycol, polycaprolactonediol, trimethylhexanediol and 1,4-butanediol.

The polycarbonate polyol may be polyester polycarbonate polyol obtainable from reaction of a polycarbonate diol with a dicarboxylic acid or a polyester dicarboxylic acid.

The amount of the polycarbonate polyol unit is preferably not less than 50 mol %, more preferably not less than 70 mol %, based on the whole polyol units.

Examples of the polyols other than polycarbonate polyol include polyethers such as polyoxyethylene glycol, polyoxypropylene glycol and polyoxytetramethylene glycol; polyester polyols such as polyethylene adipate, polyethylenebutylene adipate and polycaprolactone; acrylic polyols; castor oil; 2,2-dimethylolpropionic acid; 2,2-dimethylollactic acid; 2,2-dimethylolvareic acid and the like.

Examples of the polyisocyanates include tolylene diisocyanate, phenylene diisocyanate, 4,4'-diphenylmethane diisocyanate, hexamethylene diisocyanate, xylylene diisocyanate, 4,4'-dicyclohexylmethane diisocyanate, isophorone diisocyanate and the like. Aromatic polyisocyanates and/or isophorone diisocyanate are preferred. In case of using an aromatic polyisocyanate and/or isophorone diisocyanate, the ratio thereof to the whole isocyanate constituents is preferably not less than 50 mol %, more preferably not less than 70 mol %.

Examples of the chain-lengthening or crosslinking agents include ethylene glycol, propylene glycol, diethylene glycol, trimethylolpropane, hydrazine, ethylenediamine, diethylenetriamine, triethylenetetramine, 4,4'-diaminodiphenylmethane, 4,4'-diaminodicyclohexylmethane and water. Chain-lengthening or crosslinking agent are properly selected depending on the type of the polyol and polyisocyanate employed, and can be used in an appropriate amount.

Polycarbonate polyurethane is usually dissolved or dispersed in an aqueous medium and applied as a coating solution. Water is preferably used as medium in view of safety and hygiene, but an organic solvent may be used as an assistant for dissolution or dispersion in water.

In case of using water as medium, polycarbonate polyurethane may be forced to be dispersed therein with the aid of a surfactant. It is preferred to use a self-dispersing polycarbonate polyurethane having a hydrophilic nonionic component such as polyethers or a cationic group such as quaternary ammonium salts, more preferably a water-soluble or water-dispersible polycarbonate polyurethane having an anionic group. The water-soluble or water-dispersible polycarbonate polyurethane having an anionic group is a polycarbonate polyurethane in which a compound having an anionic group has been incorporated by means of copolymerization or grafting. The anionic group may be properly selected from sulfonic acid, carboxylic acids, phosphoric acid and salts thereof.

The counter ion of the anionic group is preferably an alkali metal ion, but in view of moist heat resistance of the capacitor, the counter ion of the anionic group is preferably selected from amine-type onium ions including ammonium ions. The amount of the anionic group in the water-soluble or water-dispersible polycarbonate polyurethane having the anionic group is preferably 0.05 to 8% by weight. When the amount of the anionic groups is less than 0.05% by weight, water solubility or water dispersibility of polycarbonate polyurethane tends to deteriorate when it is used alone. When the amount of the anionic group exceeds 8% by weight, water resistance of an undercoat may be deteriorated or moisture may be absorbed to cause blocking of films or a reduction of moist heat resistance of adhesion.

For the improvement of blocking resistance, water resistance, solvent resistance and mechanical strength of the coating layer, the coating solution may contain as a crosslinking agent, isocyanate compounds, epoxy compounds, amine compounds, aziridine compounds, silane coupling agents, titanium coupling agents, zirco-aluminate coupling agents, peroxides, heat and light reactive vinyl compounds, photosensitive resins or the like.

Also, for the improvement of blocking resistance and slip characteristics of the film, inorganic particles such as silica, silica sol, alumina sol, zirconium sol, kaolin, talc, calcium carbonate, calcium phosphate, titanium oxide, barium sulfate, carbon black, molybdenum sulfide and antimony oxide sol, or the organic particles such as polystyrene, polyethylene, polyamide, polyester, polyacrylate, epoxy resin, silicone resin and fluorine resin may be added in the coating solution unless the surface roughness of the coating layer is out of a specific range mentioned later.

The coating solution may also contain other additives such as antifoaming agent, coatability improving agent, thickening agent, antistatic agent, organic lubricant, antioxidant, ultraviolet absorber, foaming agent, dye, pigment, etc.

The coating solution may further contain polyurethane resins other than polycarbonate polyurethane used in the present invention, acrylic resins, polyester resins, vinyl resins, etc., for improving the properties of the coating layer. It is preferably to add a polyester resin thereto as it further improves moist heat resistance of adhesion between the base polyester film and the coating layer.

The ratio of polycarbonate polyurethane in the coating layer is usually not less than 10% by weight, preferably not less than 20% by weight, more preferably not less than 30% by weight, even more preferably not less than 50% by weight. When the ratio is below 10% by weight, the desired capacitor properties may not be obtained.

The alkali metal content in the coating layer is preferably less than 1,000 ppm, more preferably less than 500 ppm, even more preferably less than 20 ppm. If the alkali metal content is larger than 1,000 ppm, it may deteriorate moist heat resistance of the capacitor. Especially, when the capacitor is placed under a high temperature and high humidity condition while applying a DC voltage thereto, the electrostatic capacity of the capacitor tends to remarkably reduce. Therefore, the coating solution may be subjected to a deionizing treatment to provide a suitable coating layer.

As methods of applying the above-described coating solution to the polyester film, there are a method of applying the coating solution by using a reverse roll coater, gravure coater, rod coater, air doctor coater or another coating equipment described in "Coating method" by Yuzi Harasaki, published by Maki Shoten, 1979, before, between or after the stretching steps, and a method of applying the coating solution by using the above-described coating equipment in the process of producing the biaxially stretched polyester film, is preferred. As a method of applying the coating solution in the process of producing the biaxially stretched polyester film, a method of applying the coating solution to an un-stretched polyester film and successively or simultaneously biaxially stretching the film; a method of applying the coating solution to a uniaxially stretched polyester film and stretching the resultant film in the direction perpendicular to the uniaxial direction; and a method of applying the coating solution to a biaxially stretched film and further stretching the resultant film in the transverse and/or machine direction can be exemplified.

The stretching process is preferably carried out at a temperature of 60° to 130° C., and the stretching ratio is ordinarily at least 4 times, preferably 6 to 20 times as expressed by the area ratio. The stretched film is ordinarily heat-treated at a temperature of 150° to 250° C. It is also preferable to relax the stretched film by 0.2 to 20% in the machine and transverse directions in the maximum temperature zone of heat-treatment and/or the cooling zone at the exit of heat-treatment. A more preferable method is a method of applying the coating solution to a polyester film stretched uniaxially to 2 to 6 times at a temperature of 60° to 130° C. by roll stretching, stretching the resultant uniaxially stretched polyester film in the direction perpendicular to the previous stretching direction to 2 to 6 times at a temperature of 80° to 130° C. after appropriate drying or without such drying, and heat-treating the resultant biaxially stretched film at a temperature 150° to 260° C. for 1 to 600 seconds.

According to this method, it is possible to dry the coating layer simultaneously with the stretching of the substrate film and make the thickness of the coating layer small in accordance with the stretching ratio of the film, so that it is possible to produce a film suitable as base material of a polyester film at a comparatively low cost.

The coating solution in the present invention may be applied to either one side or both sides of the polyester film. In the case of applying the coating solution to one side of the polyester film, a coating layer other than the coating layer of the present invention may be formed on the other side of the film so as to impart other properties to the polyester film.

The polyester film may be subjected to chemical-treatment or discharging-treatment before the coating solution is applied thereto in order to improve the coating property and the adhesion of the coating layer to the base film.

The thickness of the coating layer is preferably in the range of 0.01 to 3 μm. The coating layer thickness is preferably as small as possible in view of miniaturization of the capacitor. The upper limit of coating layer thickness is preferably 3 μm, more preferably 1 μm, even more preferably 0.5 μm. However, when the coating layer thickness is too small, it is difficult to obtain a uniform coating layer and the products tend to suffer coating unevenness. Therefore, the lower limit of coating layer thickness is preferably 0.01 μm, more preferably 0.02 μm, even more preferably 0.03 μm.

The waterdrop contact angle of the thus formed coating layer surface is preferably not less than 60°. When the contact angle is less than 60°, moist heat resistance of adhesion of the coating layer to the metallized film may be deteriorated, making it unable to impart the desired moist heat resistance to the produced capacitor. Therefore, attention should be given to the amounts of hydrophilic groups, emulsifying agent and hydrophilic compound in the coating layer.

The center line average roughness (Ra) of the coating layer surface is preferably in the range of 0.005 to 0.5 μm, more preferably 0.01 to 0.3 μm, even more preferably 0.02 to 0.1 μm. When Ra is less than 0.005 μm, the slip characteristics of the film may become unsatisfactory, resulting in poor workability of the film. On the other hand, when Ra is greater than 0.5 μm, the film surface will be too rough and the produced capacitor may be unsatisfactory in moist heat resistance and dielectric properties.

As the metal to be deposited on the film in the present invention, there can be used aluminum, palladium, zinc, nickel, gold, silver, copper, indium, tin, chromium, titanium and the like. Aluminum is the most preferred. Oxides of the metals are also usable.

The thickness of the metal deposited is preferably in the range of 10 to 5,000 Å.

Vacuum deposition is usually employed for forming the metal deposit, but other methods such as electroplating and sputtering may as well be used.

Such metal deposit may be provided on both sides of the polyester film and may be subjected to a surface-treatment or a coating-treatment with another resin.

Two sheets of thus produced metallized polyester film (including roll-up of a double-side metallized polyester film with other film including the polyester film of the present invention) are wound up together, or a plurality of metallized polyester films are stacked to form a capacitor element and this element can be subjected to necessary works such as hot pressing, taping, metallikon, voltage treatment, sealing of both end faces, attachment of lead wire, etc., by ordinary methods to produce a capacitor.

Concerning long-term reliability of the capacitor, the changing ratio of electrostatic capacitance of the capacitor after having been left under an atmosphere of 85° C. and 85% RH for 250 hours while applying a DC voltage of 60 V/μm between the electrodes is preferably in the range of −10% to 10%, more preferably −5% to 5%.

As described above, the metallized film capacitor of the present invention has excellent moist heat resistance and improved long-term reliability, so that its industrial value is high.

EXAMPLES

The present invention is described in more detail with reference to the examples. It should be understood, however, that the following examples are merely intended to be illustrative and not to be construed as limiting the scope of the invention. The methods of evaluations in the examples are as described below. In the following Examples and Comparative Examples, all "parts" are by weight unless otherwise noted.

(1) Analysis of alkali metal ions

Li, Na, K, Rb, Cs and Fr contents were quantitatively analyzed by using an atomic absorption-photometer (Spectro AA, manufactured by Barlane Corp.) by a calibration curve method.

(2) Center line average roughness (Ra)

Determined according to the method of JIS B0601 using a surface roughness tester (SE-3F (trade name) manufactured by Kosaka Kenkyusho K.K.). The stylus radius was 2.0 μm, the load was 30 mg and the cut-off value was 0.8 mm.

(3) Contact angle between waterdrop and film:

The contact angle between a waterdrop of distilled water and a sample film was measured at a temperature of 23° C. and a humidity of 50% RH by using a contact angle gauge (Model CA-DT-A, manufactured by Kyowa Kaimenkagaku K.K.). The waterdrop contact angle was measured at left and right points in each of three sample films, and the average value of the six values in total was expressed as the waterdrop contact angle.

The diameter of a waterdrop was 2 mm and the value was read 1 minute after dropping the water.

(4) Change of electrostatic capacitance (a) Unloaded test

A capacitor was allowed to stand in an atmosphere of a temperature of 60° C. and a humidity of 95% RH for 1000 hours and the rate of change in the capacitance was obtained on the basis of the initial capacitance. The value obtained by subtracting the initial capacitance from the capacitance after 1000 hours was divided by the initial capacitance, and the quotient was expressed in a percentage.

(b) Loaded test

A capacitor was allowed to stand in an atmosphere of a temperature of 60° C. and a humidity of 95% RH for 1000 hours applying a DC voltage of 60 V/μm between the electrodes, and the rate of change in the capacitance was obtained on the basis of the initial capacitance. The value obtained by subtracting the initial capacitance from the capacitance after 1000 hours was divided by the initial capacitance, and the quotient was expressed in a percentage.

(c) High-loaded test

A capacitor was allowed to stand in an atmosphere of a temperature of 60° C. and a humidity of 95% RH for 1000 hours applying a DC voltage of 80 V/μm between the electrodes, and the rate of change in the capacitance was obtained on the basis of the initial capacitance. The value obtained by subtracting the initial capacitance from the capacitance after 1000 hours was divided by the initial capacitance, and the quotient was expressed in a percentage.

(d) Loaded test (High temperature)

A capacitor was allowed to stand in an atmosphere of a temperature of 85° C. and a humidity of 85% RH for 250 hours applying a DC voltage of 60 V/μm between the electrodes, and the rate of change in the capacitance was obtained on the basis of the initial capacitance. The value obtained by subtracting the initial capacitance from the capacitance after 250 hours was divided by the initial capacitance, and the quotient was expressed in a percentage.

<Synthesis of Polyurethane Emulsion>

Synthesis Example 1

472 parts of diethyl carbonate, 416 parts of 1,5-pentanediol and 472 parts of 1,6-hexanediol were reacted at 120° to 200° C. for 15 hours. The reaction mixture was then cooled to 150° C. and residual ethanol and unreacted diols were sufficiently distilled away under a reduced pressure of 10 to 50 mmHg to obtain a polycarbonate polyol. The hydroxyl number of the polyol was about 66 and the number-average molecular weight was about 2,000.

500 parts of the polycarbonate polyol, 160 parts of tolylene diisocyanate, 58.5 parts of dimethylolpropionic acid having carboxyl groups neutralized with triethylamine and 1,647 parts of methyl ethyl ketone (MEK) were put into a reactor and urethane-producing reaction was carried out at 80° C. for 4 hours. The resultant solution was gradually poured into 1,562 parts of 30° C. distilled water with stirring. Then, 106.5 parts of a 20% aqueous solution of isophoronediamine was added and the mixture was heated to 40° C. and reacted for one hour to carry out polymerization. MEK was removed under reduced pressure to obtain a polycarbonate polyurethane emulsion A with a solid content of 30%.

Synthesis Example 2

A polycarbonate polyurethane emulsion B was obtained in the same way as Synthesis Example 1 except for use of 360 parts of 1,4-butanediol in place of 1,5-pentanediol.

Synthesis Example 3

A polycarbonate polyurethane emulsion C was obtained in the same way as Synthesis Example 1 except for use of 360 parts of 1,4-butanediol in place of 1,6-hexanediol.

Synthesis Example 4

310 parts of ethylene glycol, 520 parts of neopentyl glycol, 392 parts of dimethyl terephthalate and 392 parts of dimethyl isophthalate were reacted at 120° to 200 ° C. for 6 hours. The reaction mixture was then cooled to 120° C. and residual ethanol and unreacted diols were sufficiently distilled away under a reduced pressure of 10 to 50 mmHg. Then 292 parts of adipic acid was added and the mixture was reacted at 200° C. for 8 hours to obtain a polyester polyol. The hydroxyl number of the polyol was about 104. Thereafter the same urethane production as in Synthesis Example 1 was carried out to obtain a polyester polyurethane emulsion D.

Example 1

<Production of Polyester Film>

Polyethylene terephthalate with an intrinsic viscosity of 0.66 containing 0.3 wt % of silica particles of 1.2 μm in average size was melt-extruded at 290° C. by an ordinary method to form an amorphous sheet, and this sheet was stretched 4.2 times in the machine direction at 90° C. Then a coating solution containing 100 parts (solid weight) of the polycarbonate polyurethane A in water as medium was applied on both sides of the film and the coated film was stretched 3.9 times in the transverse direction at 110° C. and heat-treated at 230° C. to obtain a biaxially stretched polyester film having a coating layer thickness of 0.05 μm and a base polyester film thickness of 5 μm. As for the alkali metal contents in the coating solution, calculated as solids in the coating solution (corresponding to the contents in the coating layer), Na was 5.0 ppm and K was 1.8 ppm, and the other metals were less than the lower limit of detection. The waterdrop contact angle and the center line average roughness (Ra) of the coating layer were 63° and 0.025 μm, respectively.

<Production of Capacitor>

On one coated surface of the obtained film, aluminum was deposited to a thickness of 450 Å by using a resistance heating type metal depositing apparatus with the pressure in the vacuum chamber being adjusted to be below $10^{-4}$ torr. The metal was deposited in stripes having a margin in the longitudinal direction of the polyester film (a repetition of 8 mm-wide deposit and 1 mm margin). The resultant metallized polyester film was slit into 4.5 mm-wide tapes each having a 1 mm-margin at the right or left side. One of the thus obtained metallized polyester films having a right margin and one of those having a left margin were put together and rolled up to obtain a roll of film. In this case, the two sheets of film were rolled up with a positional shift relative to each other so that the metallized portion protruded by a length of 0.5 mm in the width direction. This roll was pressed under a pressure of 50 kg/cm$^2$ at 150° C. for 5 minutes.

The pressed roll of film was then subjected to metal spraying at its both end faces and lead wires were attached thereto. Then the roll was immersed in a liquid bisphenol A type epoxy resin to form an epoxy resin coating with a minimal thickness of 0.5 mm, thereby producing a film capacitor with an electrostatic capacitance of 0.1 μF.

The thus obtained metallized polyester film capacitor had excellent moist heat resistance as shown in Table 1.

Comparative Example 1

A metallized polyester film capacitor was obtained in the same way as Example 1 except that no coating solution was applied.

This capacitor was inferior to that of Example 1 in moist heat resistance.

Example 2

A metallized polyester film capacitor was obtained in the same way as Example 1 except that the polycarbonate polyurethane emulsion B was applied in place of the polycarbonate polyurethane emulsion A.

Example 3

A metallized polyester film capacitor was obtained in the same way as Example 1 except that the polycarbonate polyurethane emulsion C was applied in place of the polycarbonate polyurethane emulsion A.

Comparative Example 2

A metallized polyester film capacitor was obtained in the same way as Example 1 except that the polyester polyurethane emulsion D was used in place of the polycarbonate polyurethane emulsion A.

The results are shown in Table 1.

TABLE 1

| | Coating layer Alkali metal content (ppm) | | | Base film | | Change in capacitance (%) | | | |
|---|---|---|---|---|---|---|---|---|---|
| | Na | K | The other | $R_a$ (μm) | Contact angle | Un-loaded | Loaded | High-loaded | Loaded (85° C.) |
| Example 1 | 5.0 | 1.8 | ≈0 | 0.025 | 64° | 1.5 | 1.5 | 1.5 | 0.5 |
| Comp. example 1 | — | — | — | 0.020 | 66° | −12.0 | −42.5 | −71.2 | −82.8 |
| Example 2 | 5.8 | 2.8 | ≈0 | 0.025 | 64° | 1.1 | 1.0 | 0.9 | −0.1 |
| Example 3 | 4.8 | 1.5 | ≈0 | 0.025 | 64° | 1.5 | 1.5 | 1.5 | 0.5 |
| Comp. example 2 | 4.8 | 1.5 | ≈0 | 0.025 | 64° | 1.6 | −10.9 | −17.2 | −35.6 |

The capacitor, in which polyester polyurethane is used as in Comparative Example 2, is poor in moist heat resistance. The reason is considered due to susceptibility to hydrolysis of polyester polyurethane.

What is claimed is:

1. A metallized polyester film capacitor comprising, as dielectric, a polyester film having a coating layer comprising a polycarbonate polyurethane on at least one side of the polyester film, and a metal deposited on the coating layer,
   wherein a waterdrop contact angle of said coating layer is not less than 60° the thickness of said coating layer is from 0.01 to 3 μm, and the center line average roughness ($R_a$) of said coating layer is from 0.005 to 0.5 μm.

2. A capacitor according to claim 1, wherein an amount of the polycarbonate polyurethane in the coating layer is not less than 10% by weight.

3. A capacitor according to claim 2, wherein said amount of the polycarbonate polyurethane in the coating layer is not less than 30% by weight.

4. A capacitor according to claim 3, wherein said amount of the polycarbonate polyurethane in the coating layer is not less than 50% by weight.

5. A capacitor according to claim 1, wherein an alkali metal content in the coating layer is less than 1,000 ppm.

6. A capacitor according to claim 5, wherein said alkali metal content in the coating layer is less than 500 ppm.

7. A capacitor according to claim 6, wherein said alkali metal content in the coating layer is less than 20 ppm.

8. A capacitor according to claim 1, wherein the polycarbonate polyurethane comprises a polycarbonate polyol unit in an amount of not less than 50 mol % based on the whole polyol units.

9. A capacitor according to claim 8, wherein said polycarbonate polyol has a number-average molecular weight of from 200 to 20,000.

10. A capacitor according to claim 8, wherein the polycarbonate polyurethane comprises a polycarbonate polyol unit in an amount of not less than 70 mol %, based on the whole polyol units.

11. A capacitor according to claim 1, wherein the polycarbonate polyurethane comprises an isocyanate unit selected from the group consisting of an aromatic polyisocyanates, isophorone diisocyanate and a mixture thereof.

12. A capacitor according to claim 1, wherein the thickness of said coating layer is from 0.02 to 1 μm.

13. A capacitor according to claim 12, wherein the thickness of said coating layer is from 0.03 to 0.5 μm.

14. A capacitor according to claim 1, wherein the center line average roughness ($R_a$) of said coating layer is from 0.01 to 0.3 μm.

15. A capacitor according to claim 14 wherein the center line average roughness ($R_a$) of said coating layer is from 0.02 to 0.1 μm.

16. A capacitor according to claim 1, wherein said metal is selected from the group consisting of aluminum, palladium, zinc, nickel, gold, silver, copper, indium, tin, chromium and titanium.

17. A capacitor according to claim 16, wherein said metal is aluminum.

18. A capacitor according to claim 1, wherein said polycarbonate polyurethane has a number-average molecular weight of from 1,000 to 200,000.

19. A polyester film having a coating layer comprising a polycarbonate polyurethane on at least one side of the polyester film, and a metal deposited on the coating layer,
   wherein a waterdrop contact angle of said coating layer is not less than 60°, the thickness of said coating layer is from 0.01 to 3 μm, and the center line average roughness ($R_a$) of said coating layer is from 0.005 to 0.5 μm.

* * * * *